(12) United States Patent
Grond (10) Patent No.: US 6,929,440 B1
(45) Date of Patent: Aug. 16, 2005

(54) METHOD AND STORAGE LOADING SYSTEM FOR LOADING AND UNLOADING LOADS IN STORAGE

(76) Inventor: Johann Walter Grond, Schmackweg 9, D-26723 Emden (DE)

( * ) Notice: Subject to any disclaimer, the term of this patent is extended or adjusted under 35 U.S.C. 154(b) by 0 days.

(21) Appl. No.: 09/868,090

(22) PCT Filed: Dec. 15, 1999

(86) PCT No.: PCT/DE99/03990

§ 371 (c)(1),
(2), (4) Date: Jun. 14, 2001

(87) PCT Pub. No.: WO00/35780

PCT Pub. Date: Jun. 22, 2000

(30) Foreign Application Priority Data

Dec. 15, 1998 (DE) .............................. 198 57 886

(51) Int. Cl.[7] .............................................. B65G 1/06
(52) U.S. Cl. ..................................... 414/284; 414/806
(58) Field of Search ............................... 414/234, 285, 414/236, 807, 286, 279, 284, 806

(56) References Cited

U.S. PATENT DOCUMENTS

| | | |
|---|---|---|
| 3,519,149 A | 7/1970 | Saul |
| 3,746,189 A | 7/1973 | Burch et al. |
| 4,007,843 A * | 2/1977 | Lubbers et al. ............ 414/273 |
| 4,265,582 A | 5/1981 | Theobald |
| 4,428,708 A * | 1/1984 | Burt ........................... 414/275 |
| 4,459,078 A * | 7/1984 | Chiantella et al. .......... 414/279 |
| 4,538,950 A * | 9/1985 | Shiomi et al. ........ 414/222.06 |
| 4,856,956 A | 8/1989 | Zur |
| 4,966,513 A * | 10/1990 | Motoda ...................... 414/277 |
| 5,002,449 A * | 3/1991 | Kita et al. .................. 414/273 |
| 5,096,355 A * | 3/1992 | Schröder .................... 414/273 |
| 5,286,157 A * | 2/1994 | Vainio et al. ............... 414/273 |
| 5,388,955 A | 2/1995 | Schroder |
| 5,564,879 A | 10/1996 | Noguchi |
| 5,615,992 A | 4/1997 | Proske et al. |
| 5,664,688 A | 9/1997 | Kitanaka et al. |

(Continued)

FOREIGN PATENT DOCUMENTS

CH    678310    8/1991

(Continued)

Primary Examiner—Eileen D. Lillis
Assistant Examiner—Charles A. Fox
(74) Attorney, Agent, or Firm—Collard & Roe, P.C.

(57) ABSTRACT

The invention relates to a particularly effective method for loading and unloading loads in a rack storage facility with several rack bays and aisles which are located between the rack bays. According to the method, a load is transported to a front end of a rack bay and at the front end of the rack bay, is moved in a vertical direction to a target level. The load is then moved into the aisle in a horizontal direction, at the target level. The load is moved in the aisle to a target location at the corresponding target level and then finally out of the aisle and into the rack in a horizontal direction. The invention also relates to a storage loading system for carrying out the inventive method. According to this method, several guiding elements corresponding to the individual levels of the rack bays are provided in the aisles. Moveable transport devices for receiving loads are provided on the guiding elements.

13 Claims, 7 Drawing Sheets

U.S. PATENT DOCUMENTS 5,707,199 A * 1/1998 Faller .................... 414/239
5,927,926 A * 7/1999 Yagi et al. ............ 414/661 X
6,149,366 A * 11/2000 Deandrea ................ 414/279

FOREIGN PATENT DOCUMENTS

| DE | 1531898    | * 12/1967 |
|----|------------|-----------|
| DE | 1271 030   | 6/1968    |
| DE | 1 940 347  | 2/1970    |
| DE | 1938473    | 4/1971    |
| DE | 2113202    | 10/1972   |
| DE | 2221789    | 11/1972   |
| DE | 33 00 441  | 9/1984    |
| DE | 43 06 469  | 9/1994    |
| DE | 1 531 898  | 1/1997    |
| DE | 297 17 499 | 3/1998    |
| EP | 0133472    | 2/1985    |
| EP | 0 798 238  | 10/1997   |
| EP | 1 157 947  | 11/2001   |
| FR | 1180339    | 6/1959    |
| JP | 5-270650   | 10/1993   |

\* cited by examiner

METHOD AND STORAGE LOADING SYSTEM FOR LOADING AND UNLOADING LOADS IN STORAGE

CROSS REFERENCE TO RELATED APPLICATIONS

Applicant claims priority under 35 U.S.C. §119 of German Application No. 198 57 886.5 filed Dec. 15, 1998. Applicant also claims priority under 35 U.S.C. §120 of PCT/DE99/03990 filed Dec. 15, 1999. The international application under PCT article 21(2) was not published in English.

The invention relates to a method and a storage system for loading and unloading loads in a rack storage warehouse comprising a plurality of rack bays as well as aisles that are located between the bays of racks. Furthermore, the invention relates to a transport system, a lifting and pushing system, and a rack element for use in a storage system as defined by the invention.

Such rack storage warehouses have been serviced until now with the help of fork-lift trucks and/or floor conveyor devices that can be operated partly by hand and partly in an automated manner. It is necessary in conjunction with such storage systems that a transporting device having a high dead weight always has to be moved together with the load to be transported as well. This requires relatively high expenditure in terms of energy and the possible speed is limited.

Therefore, the invention is based on the problem of providing a method and a storage system of the type specified above that operates at a particularly high speed and with low energy expenditure.

According to the basic idea of the method as defined by the invention, in a rack storage warehouse comprising a plurality of bays of racks each in turn comprising a plurality of rack levels, as well as rack aisles located between said bays of racks, a load is transported to the front end of a rack bay. From the front end of the bay of racks, the load is then moved in the vertical direction to a target level, then transported along the aisle between the racks at the target level in the horizontal direction, subsequently moved along the aisle in the horizontal direction up to a target location situated at the respective target level, and finally conveyed in the horizontal direction from the aisle between the racks to the target location in the rack. Said method simplifies the loading and unloading of loads because the loads are first placed at the front end of a bay of racks or in a gap between two sections of racks, and the load is then vertically transported to the desired target level, and can then be treated and transported in all other respects as if it were already in the rack and only would have to be removed from the shelf of the rack, transported along the aisle and deposited again in a desired location. When loads are removed from storage, the above steps are carried out in the reverse order. The method thus can be employed for storing loads and then removing such loads again from storage. The exchange of loads is possible by said method as well, whereby in step "d", the load to be stored is first transported to the target location offset by only one width of the load, the load to be removed in moved in the horizontal direction from the rack into the aisle, the load to be stored is subsequently moved by one width of the load in the horizontal direction until it is in the target location at the respective target level, and then moved into the rack in step "c". The load to be removed is then removed from the rack storage facility in the manner described above. The changes in direction in the individual steps of storing and removing loads from storage or transportation of the loads are preferably carried out at an angle of 90°.

It is important for the storage system that provision is made in the aisles for a plurality of guiding elements that are associated with the individual levels of the bays of racks, and that provision is made for transport devices that are movable on the guiding elements and suitable for receiving loads; and that in conjunction with the transport devices, provision is made for a device for displacing the loads in the racks sideways. It is possible with such a storage loading and unloading system to operate a storage facility in a fully automatic manner. Furthermore, it is no longer necessary to switch the traffic in the aisles between the racks, so that the latter only need to have the width of the loads to be transported and consequently substantially have to have the same width as the racks themselves, which means that the size of the overall storage facility is accordingly small.

The system for displacing the loads into the racks sideways is preferably formed by a lifting and pushing device that is capable of lifting the load to be displaced over a small distance, preferably only by about 1 cm, so that the load can be pushed into the rack and onto the support struts arranged in the rack. After reaching the rack, the lifting and pushing device is lowered, so that the load is resting on the support struts located in the rack, and the lifting and pushing device can then be driven again out of the rack and onto the transport device. The drive of the lifting and pushing device preferably comprises toothed gears and toothed racks, or a screw drive and a gear rim.

In an advanced embodiment of the invention, provision is made at the ends of the bays of racks for lifting devices by means of which the loads can be raised up to the guiding elements. Such lifting devices favorably may be realized in the form of devices of the type of an elevator that has a floor that is identical with the floor of a rack, so that after the target level has been reached, it is possible to home in on the floor in exactly the same manner as on the usual target location in the rack. Provision is preferably made for a lifting system at each front end. If the turnover in the storage facility is low, it is conceivable also to arrange only one lifting system on each aisle between racks. The lifting systems and the transport devices can be driven preferably by means of a pulling system, as such pulling systems can be handled in a particularly easy manner and employed in an energy-saving way. Furthermore, the lifting systems and the transport devices can be constructed in this way in a simple manner, and can be easily replaced when required. Alternatively, each lifting system and each transport device can be driven by its own hydraulic drive or by a motor drive. In particular in the aisles of the racks, it is favorable if the transport devices are equipped with their own motor drives, so that the transport devices are operated there in a self-propelled manner, and, furthermore, a number of transport devices can be driven simultaneously.

In a preferred embodiment of the invention, a multitude of rack elements are associated with each level of the bays of racks, whereby the rack elements comprises the guiding elements on which the transport devices can be driven. A standardized installation element is made available with such rack elements that can be secured on the rack bays and employed as a type of module in rack storage facilities of any desired size.

Another aspect of the invention consists in the fact that transport devices, lifting and pushing systems and rack elements are made available for use in such a storage systems as defined by the invention for loading and unloading loads. Said three elements form the actual component by means of which nearly any desired commercial rack storage facility can be re-fitted at a later time to obtain a rack storage system as defined by the invention, the goal accomplished being that loads can be stocked in very high numbers of units in a space with a comparatively very small surface area, and quickly moved and transported at favorable cost. Such a storage warehouse can be operated in a fully automatic manner as well, and maintained intact without any problems owing to the low number of different elements, by replacing any units that may be defective.

It is particularly favorable in conjunction with such transport devices that the latter comprise wheels or rollers having a running surface adapted to the shape of the guiding elements, so that the transport devices are capable of travelling on the guiding elements in a safe and reliable manner. Particularly favorable is a running surface in the form of a circular segment in association with a tubular guiding element. Furthermore, the transport device is preferably realized in such a way that it can be coupled to a second transport device, so that two transport devices that are connected to each other can be arranged in the aisles between the racks if this is deemed required or desirable for loading and unloading loads in the same locations.

However, the transport device may be realized also in the form of storage pallets that are not equipped with their own wheels but are transported on revolving belts.

The lifting and pushing system is preferably designed in such a way that running wheels are arranged in the lower zone of the system and provision is made for a lifting device acting in the upward direction. The lifting system is preferably operated in this conjunction with a worm and toothed gear drive and permits a precise lift by just a new millimeters, in particular by 9 mm. The running wheels permit a vertical movement in relation to the rack aisle, so that the lifting and pushing system can be driven into the rack by the transport carriage running in the rack aisle. The drive in said direction preferably takes place by means of a toothed gear that engages a toothed rack arranged in the floor of the racks. It is particularly preferred if the lifting system comprises a multitude of lifting racks for raising a lifting component, such lifting racks each being provided in such a way that they alternate with a multitude of running wheels in the lifting and pushing system. Due to such an arrangement, the floor of the racks is utilized for absorbing the pressure, which permits a particularly simple structure of the lifting and pushing system because no counterweight or other elements are required for absorbing the force exerted by the weight.

The rack element preferably comprises fastening elements for attaching said rack element to two bays of racks located next to each other. The rack element spans an aisle between two racks in this way and assures a defined spacing between two bays of racks, whereby such spacing only has to correspond with the width of the bay of racks because the load in the rack can be displaced without requiring any additional space for switching operations. Furthermore, the rack element preferably comprises an electrical current and data carrier rail. Tapping elements are favorably provided on the transport devices and the lifting and pushing systems as well, which receive the required control data and the electrical energy needed for the movements when required. The feed of electrical power is particularly favorable for the operation of the lifting and pushing system and the motor-driven lifting motion of the lifting and pushing system because the latter does not require any energy source of its own in this way, and therefore can be structured with a light weight and a simple construction. The guiding elements are preferably realized in the form of tubes, which are integrated in the rack element as well. Said guiding elements overall form a guiding track on which the wheels of the transport device can run along. The individual rack elements preferably each comprise at least one revolving chain drive, which can be engaged by the transport devices with the help of a holding element or pulling cable in order to drive the transport devices in this way. As a supplementary measure, two of such rack elements are connected with a further rotating chain drive, so that only one drive has to be available in one rack aisle by which all chain drives of the individual rack elements can be driven. In this conjunction, the individual rack elements preferably have a length of 1.75 m and are thus slightly larger than a standard load, so that in particular loads transported on storage pallets can be transported by sections and the conveyance can be interrupted by sections, so that individual loads can be loaded in the racks or removed therefrom. Said last-mentioned variation is preferably employed exclusively within the feeding area, thus when loads are stored and removed from storage in the rack system.

Furthermore, provision is preferably made in the same manner for a second parallel chain drive parallel, such second chain drive serving for driving the transport devices in the opposite direction. Basically, however, a through-extending cable is conceivable as a drive as well. Possible are also other means of driving such as, for example equipping each transport device with its own motor.

Another preferred driving possibility comprises the use of conveyor belts, on which storage pallets are directly loaded and transported by the conveyor belts. Such conveyor belt sections preferably have a length of 1.75 m and substantially consist of rollers, which are connected and driven by means of chains, such chains transporting the upright load on their top parts. The width of the rollers is variable and can be adapted to the given width of the loads to be transported.

The invention is explained in the following in greater detail with the help of an exemplified embodiment shown in the drawing, in which the following is shown in detail by schematic representations.

Figure 1:
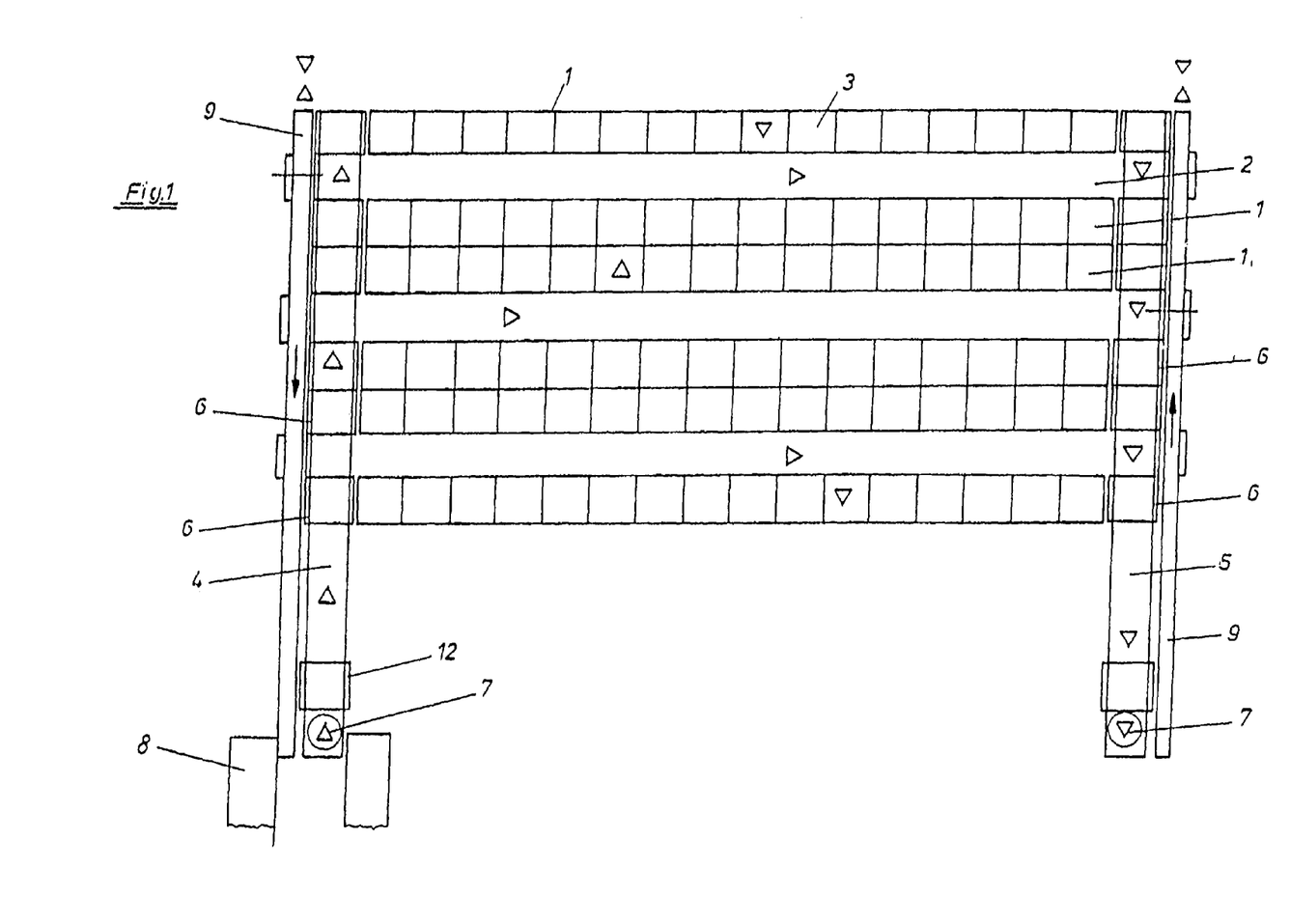
FIG. 1 is an overview of a storage system as defined by the invention.

FIG. 1 shows a schematic overall view of a storage system as defined by the invention. In the exemplified embodiment shown, said storage system comprises the six rack bays 1 and the three rack aisles 2. The individual rack bay 1 comprises a plurality of rack levels and the different rack compartments 3, which are indicated in the drawing. The bays of racks are straight and aligned parallel with each other. At a right angle in relation to the bays of racks, provision is made for a rack loading track 4 and a rack unloading track 5, which each extend along the face sides of the rack bays 1. It would be possible also to operate with only one rack loading and unloading track; however, a higher storage turnover is possible when two separate tracks are used. Transport devices carrying the load to be stored run on the loading track 4 up to a vertical conveyor 6. Said vertical conveyors each are located on the face sides of the rack bays 1 and are to that extent standing on the loading track 4 and the unloading track 5. Furthermore, provision is made for a centering and load detection site 7, a truck unloading and loading station, and a return belt 9.

Figure 2:
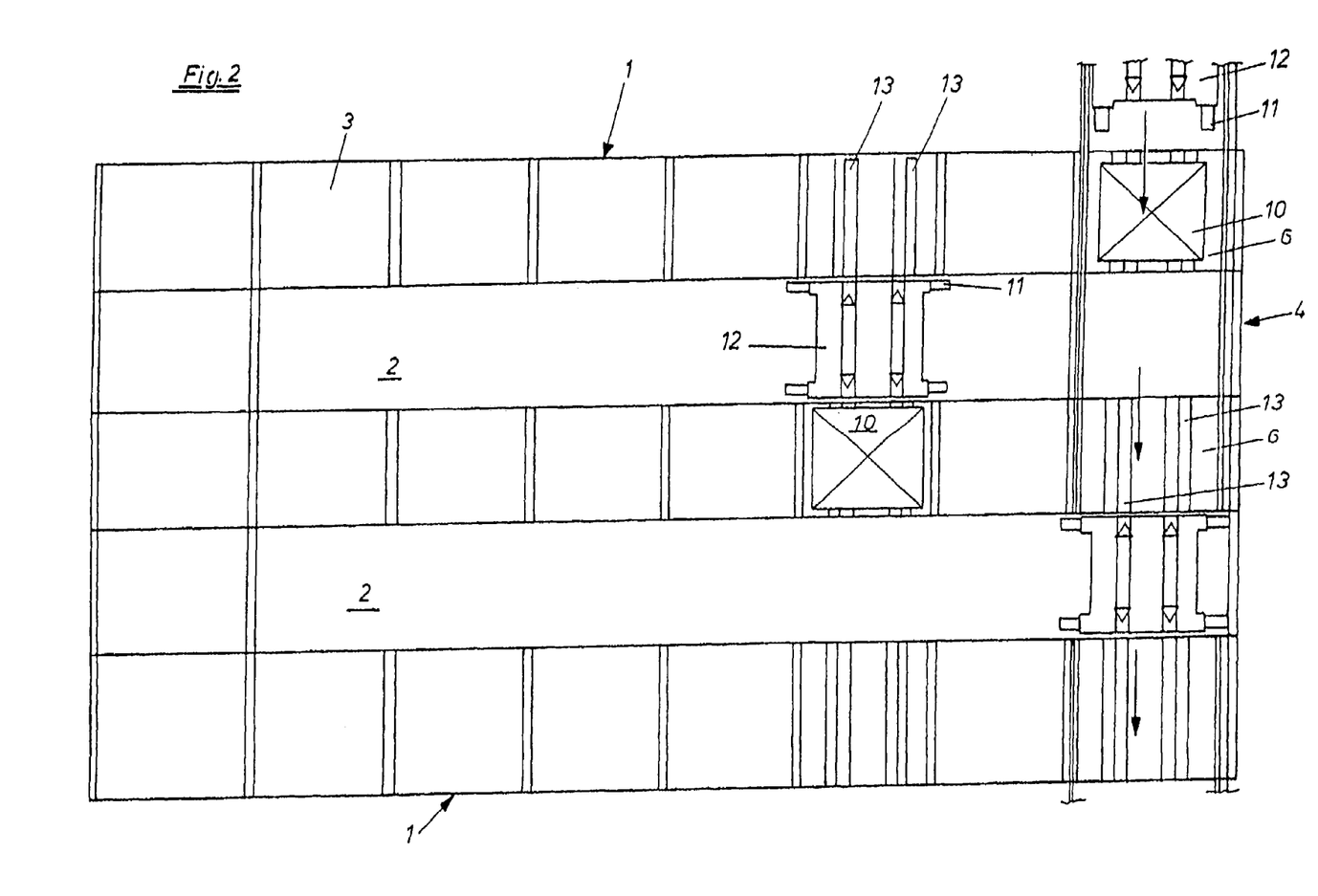
FIG. 2 is a top view of a part of a storage system as defined by the invention.

FIG. 2 shows at the right-hand margin of the illustration a rack loading track 4, from which the rack bays 1 and the rack aisles 2 extend at right angles. On the face sides of the rack bays 1, provision is made for lifting systems that are formed by the vertical conveyors 6. The transport devices 1 can be driven back and forth in guiding elements not shown here, which are located in the rack aisles 2 at each level of the racks. A lifting and pushing system 12 is arranged on said transport devices 11, on which system the loads 10 can be set down and then be deposited in one of the rack compartments 3 on the rack floor support struts 13.

Figure 3:
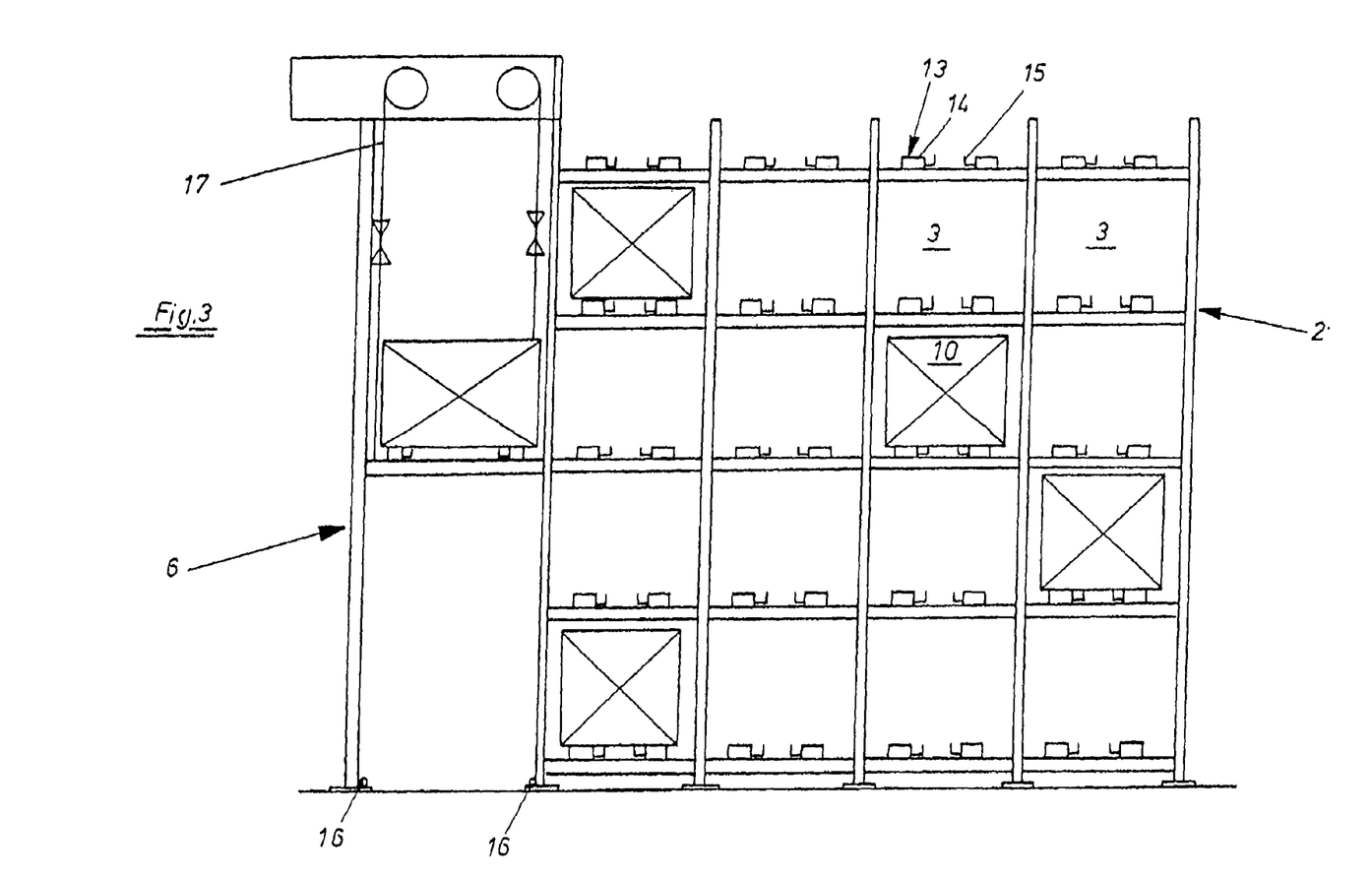
FIG. 3 is a side view of a part of the storage system as defined by the invention.

FIG. 3 shows by a side view a rack bay 1 with a great number of the rack compartments 3. The two rack floor support struts 13 are arranged in each of the rack compartments 3, such support struts substantially consisting of a reinforcing section 14 and a running wheel track 15. The reinforcing sections 14 serve the purpose of receiving the rack loads 10, whereby provision is made in a rack compartment 3 for the two rack floor support struts 13, whereby the spacing between said support struts is smaller than the width of the loads to be deposited. As such loads are loads having standardized dimensions, the rack storage facility and thus also the spacing between the two support struts 13 of the rack floor can be realized in a standardized manner. On the left-hand face side of the rack bay 2, provision is made for a vertical conveyor 6. In the exemplified embodiment shown, said vertical conveyor substantially comprises a floor with the two rack floor support struts 13 and can be driven up and down with the help of a cable tackle gear 17. At the bottom of the vertical conveyor 6, provision is made for the guiding elements 16, which represent a component of the loading track 4.

Figure 4:
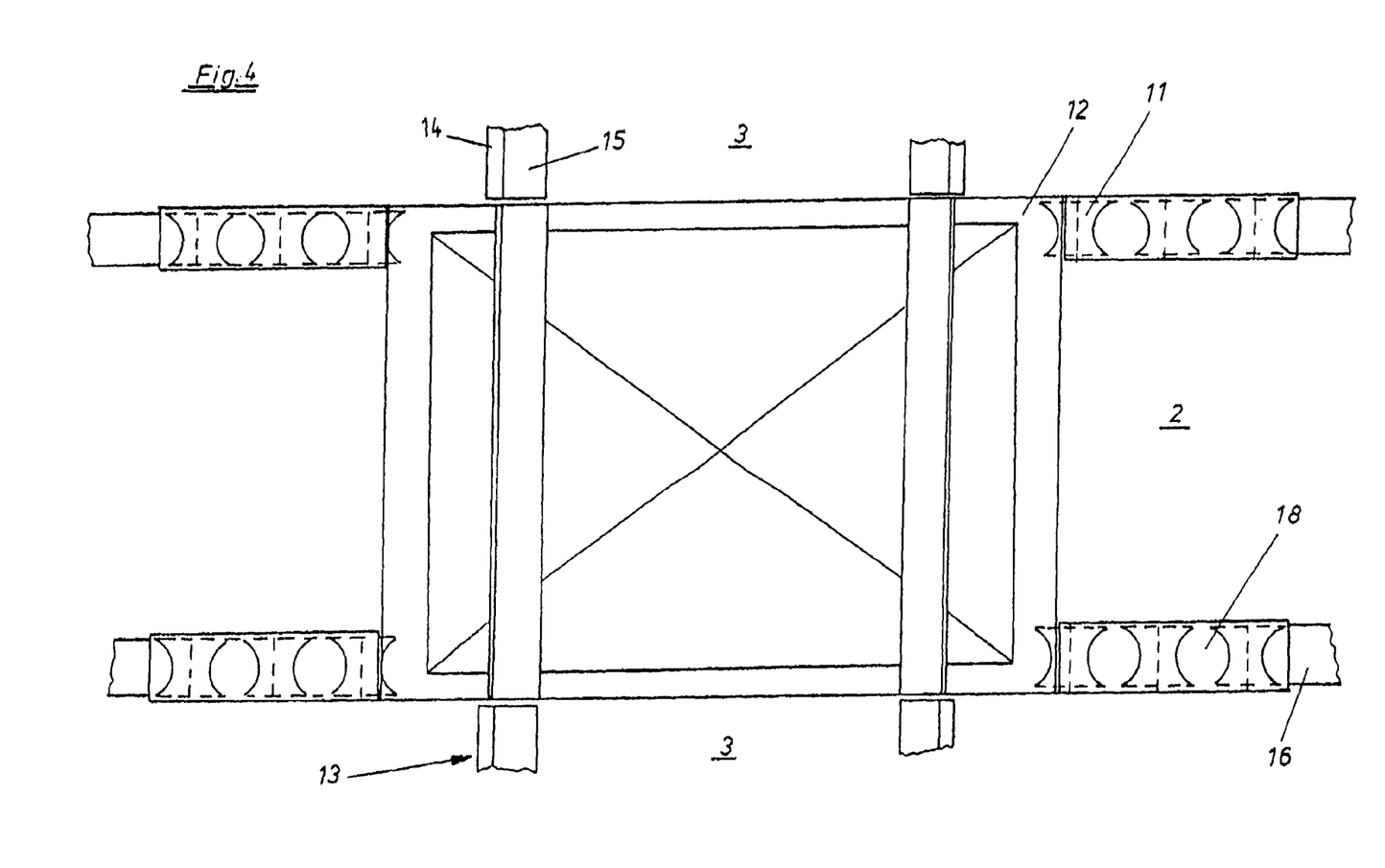
FIG. 4 is a top view of a lifting and pushing system in the storage system.

FIG. 4 shows a rack aisle 2, which is adjoined at the right and left hands—or at the top and bottom in the drawing—by bays of racks with the rack compartments 3. In the rack aisle 2, the guiding elements 16 are arranged closely neighboring the rack bays 1, and a transport device 11 runs along said aisles on the rollers 18. The transport device 11 may be realized also in the form of a transport vehicle or transport carriage. So as to better distribute the weight of the received load and to operate the transport device with as little friction as possible, provision is made for a great number of the rollers 18, on which the transport device runs along on the guiding elements 16. The guiding elements 16 form a guide track that extends over the entire rack aisle up to in front of the vertical conveyor 6. A lifting and pushing system 12 is arranged on the transport device 11. In the position shown, said lifting and pushing system is positioned exactly in front of a rack compartment 3, so that the running wheels of the lifting and pushing system 12 are exactly positioned in front of the support strut 13 of the rack floor, or stated more precisely, exactly in front of the running wheel track 15 of the support struts 13 of the rack floor. From said position, the lifting and pushing element 12 is capable of selectively driving into one of the two adjacent rack compartments 3 and depositing the received load there, or of picking up a load stored there.

Figure 5:
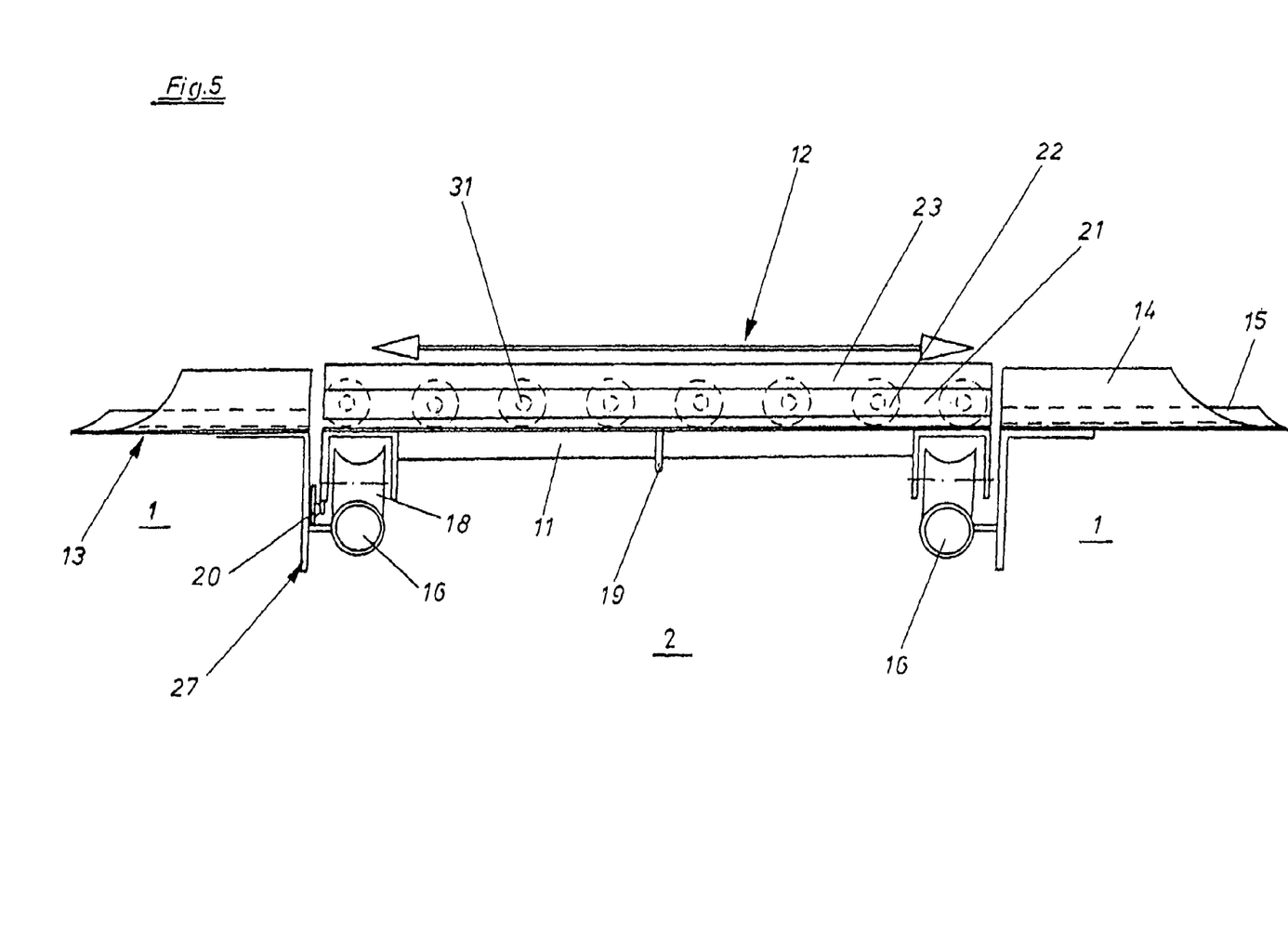
FIG. 5 is a cross sectional view with a section through a lifting and pushing system according to FIG. 4.

FIG. 5 shows a cross section through a lifting and pushing system that is located in a position similar to the one shown in FIG. 4. The transport device 11 and the lifting and pushing system 12 are present in a rack aisle 2, which is adjoined on the right- and left-hand sides by the rack bays 1. The guiding elements 16 are secured on the rack bays 1. Said guiding elements have a circular cross section and the rollers 18 of the transport device 11 run on said guiding elements. The rollers 18 have a running surface that is recessed in the form of the segment of a circle, said running surface corresponding with the surface of the guiding element 16 having a circular cross section, so that particular safe guidance of the transport device is assured. The transport device 11 comprises a pulling part 19 that serves for receiving a cable or a chain by means of which the transport carriage 11 can be driven along the rack aisle 2. Furthermore, provision is made for an electric current and data carrier rail 20, via which the control commands and electrical energy are transmitted to the transport device 11 and the lifting and pushing system 12. The lifting and pushing system 12 comprises a carrier frame 21, on which a multitude of the running wheels 22 are secured. On said running wheels, the lifting and pushing system 12 can be driven to the left and right. Overall, the lifting and pushing system 12 comprises two parallel rows of such running wheels 22, such rows being spaced from each other to such an extent that their mutual spacing corresponds with the spacing between two support struts 13 of the rack bottom. Furthermore, the lifting and pushing system 12 comprising a lifting component 23 that can be raised or lowered by a few millimeters, so that the top side of the lifting component 23 is located just slightly higher than the reinforcing section 14, or just slightly lower than the reinforcing section 14 of the rack floor support strut 13. With the lifting component 23 in the raised position, the lifting and pushing system 12 is in this way capable of driving with a load into a rack compartment, lowering itself, and subsequently driving without the load back onto the transport device 11, with the load remaining behind on the reinforcing section 14 of the support strut 13 of the rack floor.

Figure 6:
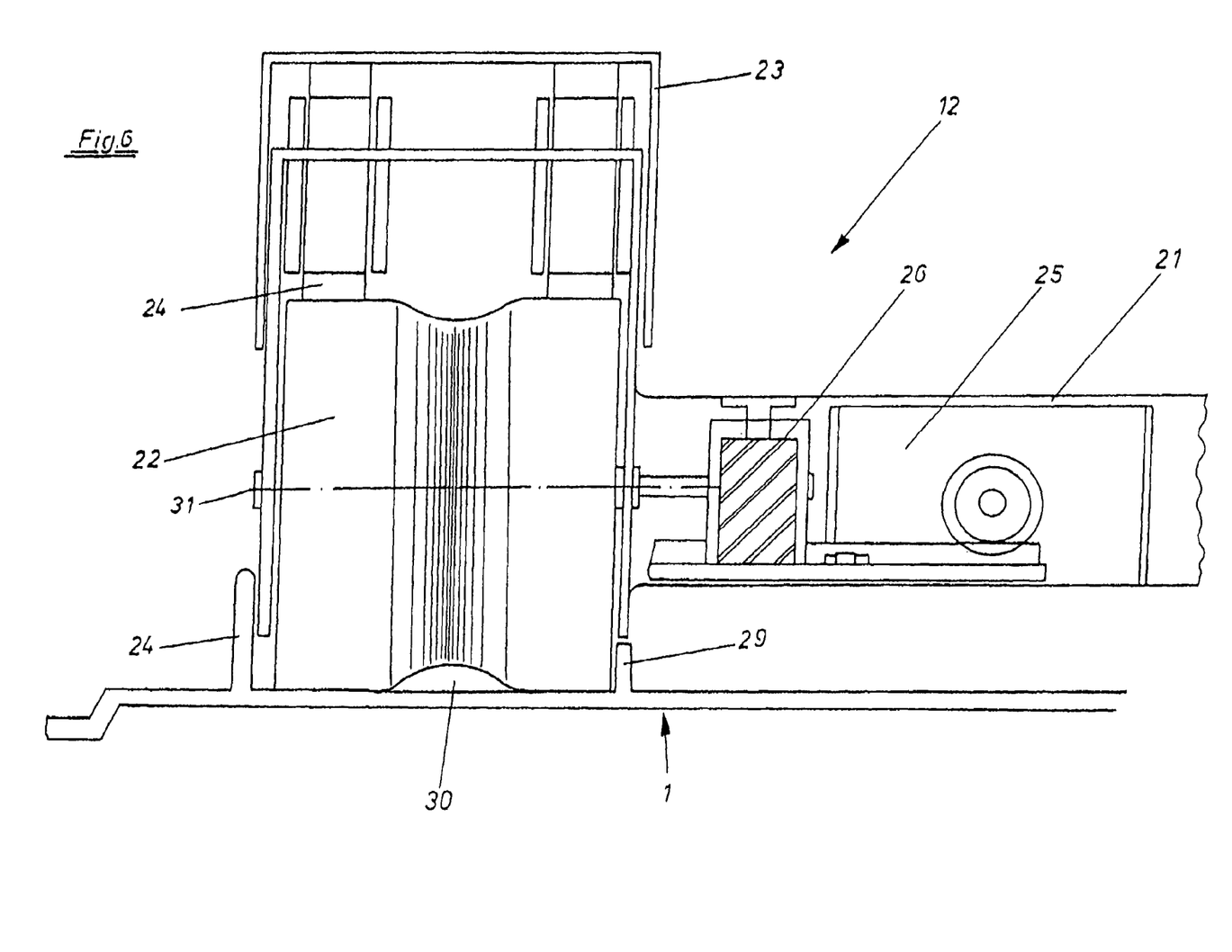
FIG. 6 is a cut side view of a cutout of a lifting and pushing system.

FIG. 6 shows a cross sectional view with a cut through a part of the lifting and pushing system 12. The running wheels 22 of the lifting and pushing device 12 run in two side limitations 29 of the transport device 11. As a supplementary measure, the running wheel 22 has a recess located in the center area of the running surface that corresponds with a projection 30 located on the bottom of the transport device 11. The running wheel 22 is supported by an axle 31 that is secured on the support frame 21 of the lifting and pushing system 12. Provision is made in the support frame 21 for a motor 25 that actuates by means of a worm and toothed gear drive 26, or with a toothed gear and a toothed rack a lifting bar 24 by means of which the lifting component 23 can be raised in a precise manner. In the figure, the lifting bar 24 is arranged behind the running wheel 22. Provision is made behind said lifting bar for another running wheel 22, and then again for a further lifting bar 24. The running wheel 22 can be driven by means of a motor arranged in the support frame as well, so that the drive takes place via the running wheels 22. As an alternative, it is possible also to drive a toothed gear that engages a toothed rack that is located on the bottom and advances the lifting and pushing device 12 in this way.

Figure 7:
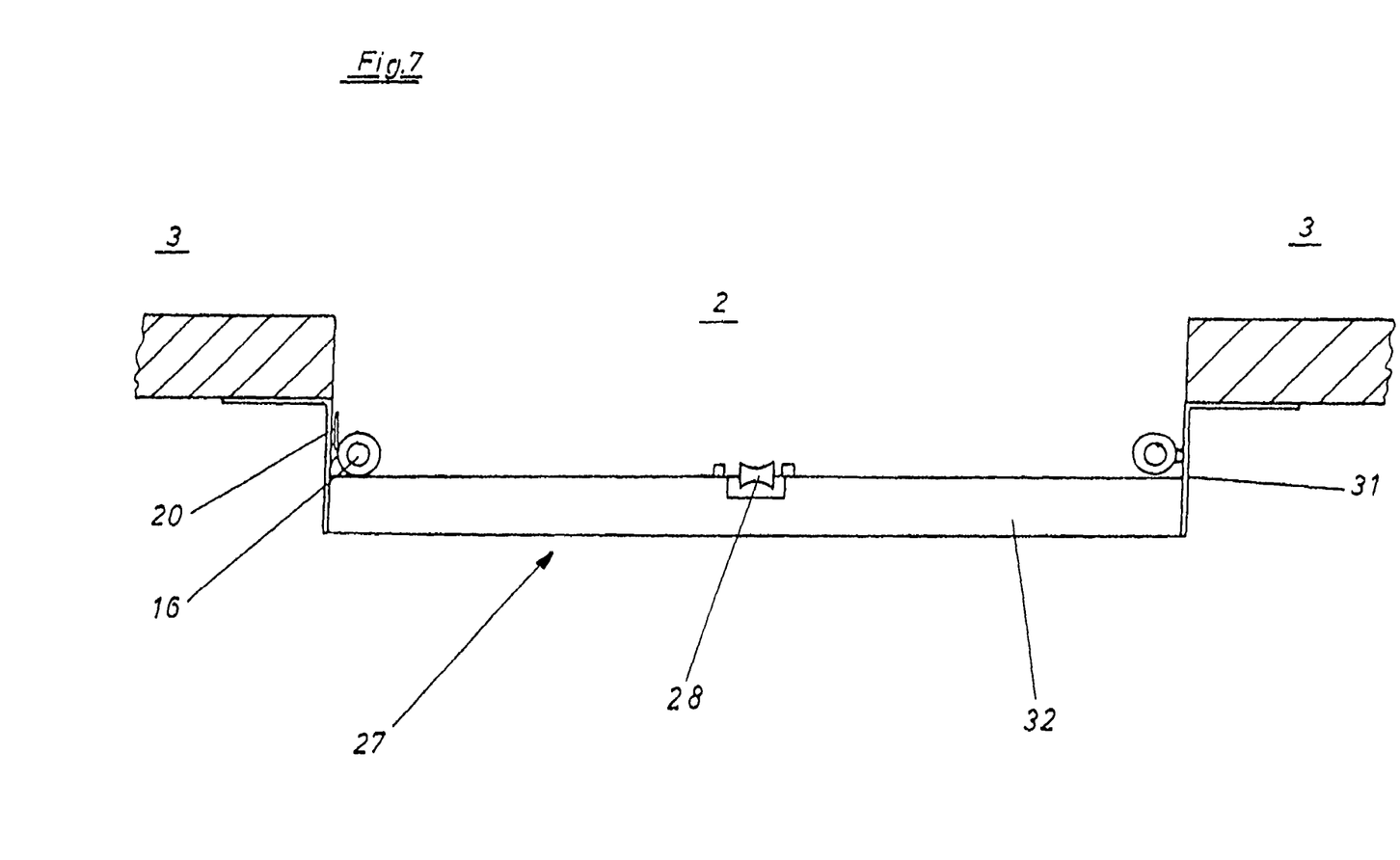
FIG. 7 is a cut side view of a rack element of a storage system as defined by the invention.

FIG. 7 shows a cross section through a rack element 27 that spans a rack aisle 2 and is secured on the rack compartments 3 or the rack bays 1. The rack elements 27 can be referred to also as rack aisle elements. The rack element 27 substantially comprises the transverse struts 32 and is secured on the rack bays 1 by means of the fastening angles 31. A defined spacing is assured in this way between the rack bays 1. The guiding elements 16 are secured on the rack element 27, said guiding elements forming the guide track for steering the transport devices 11. Furthermore, the rack elements 27 comprises the data and electric current carrier rail. In the center area of the transverse strutting 32, a driving device 28 is shown by means of which the transport devices 11 can be driven. It is particularly possible to make provision in this regard for revolving chain drives that can be engaged by the pulling component 19 of the transport device 11.

The storage system described above operates as follows: In the truck loading and unloading station 8 shown in FIG. 1, the loads are moved from the truck on a ramp with the help of the lifting and pushing devices 12. Therefore, loading and unloading of the truck is carried out using the same elements that are employed also for loading and unloading the rack storage facility. In this way, the truck loading and unloading operation is tied into the overall system. The loads may be pallets, collies and other types of load. Such loads are deposited in the centering and load detection site 7, where they are automatically detected. By means of an EDP-control, a defined storage place or a rack compartment 3 is assigned to the load, such storage place or compartment depending on the dimensions, the weight and the height of the load. The lifting and pushing element 12, which is present directly in front of the centering and load detection site 7, picks up the load and drives up to a rack aisle 2, so that the lifting and pushing system 12 with the load present thereon is directly positioned in front of a lowered lifting device. The other vertical conveyors 6, which are not to be loaded at that moment, are in sort of a waiting position at the level of the first or second rack, so that the transport devices are capable of driving on the loading track 4 without obstruction up to the desired vertical conveyor 6, the latter being in the position lowered down to the floor. In addition or alternatively, the support struts provided in the vertical conveyor 6 can be displaced sideways outwards. A passage measure is realized in this way that permits the transport devices running on the loading track to move horizontally. This permits overall a trouble-free operation on the level of the floor. The lifting and pushing system 12 now advances on the floor of the lifting device or vertical conveyor 6 and deposits the load on the vertical conveyor 6, so that the load is directly positioned at the face side of a rack bay 1. The lifting and pushing part 1 is then lowered and driven back a short distance, so that the vertical conveyor 6 can then be driven vertically upwards with the help of the cable tackle gear 17. Alternatively, the loading track 4 and the unloading track 5 may be exclusively operated with transport devices without the lifting and pushing systems mounted on such transport devices. In such a case, the lifting device 6 has to be lowered to a level located slightly below the loading track 4, so that the transport device is capable of driving above the lowered vertical conveyor 6, and the vertical conveyor 6 can pick up the load as it drives up. The lifting and pushing part 22 then continues to drive on the loading track 4 up to the end, and is then driven back to the centering and load detection site 7 with a return guide 9. For reasons of space saving, the return guide 9 may be realized in such a way that the lifting and pushing part 12, which is always empty when on the return guide 9, is returned in a vertical position. The vertical conveyor 6 moves the load 10 up to the desired target level. At said target level, a transport device, whose idle position is favorably located in about the center of a rack aisle 2, drives directly up to in front of the vertical conveyor 6. The lifting and pushing device 12 then drives in the lowered position under the load 10, whereby the lifting component 23 of the lifting and pushing device then moves up and lifts off the load from the rack floor support struts 13. The lifting and pushing device then drives back into the rack aisle and onto the transport device 11. The transport device 11 then drives along the rack aisle up to the target location, thus in particular to a rack compartment 3. The load 10 is then moved into said rack compartment 3 with the help of the lifting and pushing element 12 in that the lifting and pushing element 12, with its lifting component 23 raised, drives into the rack compartment, and the lifting component 23 is then lowered, so that the load 10 is deposited on the support struts of the floor of the rack. If the load 10 is to be loaded for storage in a space where another load is already stored, two transport devices 11 that are connected with each other and comprise the lifting and pushing devices 12 mounted thereon, are put into motion, and the free lifting and pushing device picks up the load and drives sideways by the width of a rack compartment 3, so that the other transport device carrying the load to be stored is capable of driving up in front of the rack compartment that has become vacant. A load is unloaded in an analogous manner via the vertical conveyor 6, which is arranged in FIG. 1 on the right-hand side, and by way of the unloading track 5.

The entire storage system can be controlled fully automatically by means of electronic data processing systems and it can be manufactured in terms of engineering in a particularly simple manner owing to the use of identical elements. Furthermore, it can be serviced in an especially simple way. Only the rack elements that form the loading track 4 and the unloading track 5, on the one hand, and the guiding elements in the rack aisles leading to the various rack levels of the racks on the other, have to be added to the known components of a storage system storage system. The transport devices 11 together with the lifting and pushing devices 12 run on said tracks. On the loading track 4, the transport device 11 and the lifting and pushing device 12 are positioned one on top of the other in such a way that both are running in the same direction, whereas in the rack aisles 2, the lifting and pushing device 12 is positioned on the transport device 11 in a way such that their directions of movement are turned against each other by 90°. Furthermore, only the vertical conveyors 6 have to be supplemented, their floors having the same construction as the floors of the rack compartments 3. The method and the storage system as defined by the invention offer substantial advantages vis-à-vis conventional storage systems with respect to exploitation of space and savings in energy and costs. The benefits gained with respect to exploitation of space are substantially obtained owing to the fact that the rack aisles can be kept very narrow because switching operations in the rack aisles are no longer required. Furthermore, the individual levels of the racks may substantially correspond with the height of the loads to be stored because the loads are supported on the transport devices is absolutely horizontal positions and can be pushed into the bays of racks and rack compartments in a straight line. On the other hand, fork-lift trucks, for example, operate with slightly tilted support elements, so that the loads are pushed into the rows of racks at an angle, which means that a greater height is required. Furthermore, the loads and the pallets arranged underneath the loads are damaged by such a way of handling loads in most cases. Model calculations have shown that the storage system as defined by the invention can be operated with substantially lower expenditure of energy than possible in conjunction with conventional systems. This is substantially a result of the fact that the loads are transported with the vertical conveyors in the vertical direction and finally have to be lifted into the rack with the lifting and pushing device, and that as opposed to known systems, no heavy loads inherent in the lifting systems as such have to be jointly transported. An operational analysis has shown that a storage system of the type as defined by the invention can be operated at a fraction of the costs required for operating a known storage system.

What is claimed is:

1. A method of loading and unloading loads in a rack storage warehouse comprising a plurality of rack bays having a plurality of rack levels, and each rack level having a plurality of rack compartments, as well as a plurality of rack aisles located between the rack bays, method of loading and unloading comprising the steps:
   (a) transporting the load via a portable transport device in a first horizontal direction along a loading track that extends along front ends of the plurality of rack bays to a stationary vertical conveyor at a front end of a target rack bay;
   (b) removing the load from the transport device;
   (c) depositing the load on said stationary vertical conveyor via a lifting/pushing device on said transport device which is on said loading track;
   (d) transporting the load in a first vertical direction via said stationary vertical conveyor up said front end of said target rack bay to a target rack level;
   (e) moving a transport device along a rack aisle to a position adjacent to said stationary vertical conveyor and above said loading track;
   (f) removing the load from said stationary vertical conveyor via a lifting/pushing device on said transport device in said rack aisle at said target rack level;
   (g) transporting the load in a second horizontal direction in the rack aisle via said transport device movable on guiding elements associated with each individual level of the rack bays, to a target rack compartment in said respective target rack level;
   (h) transporting the load in a third horizontal direction from the rack aisle into said target rack compartment via said lifting and pushing device of said transport device, capable of lifting the load over a small distance; and
   (i) depositing the load in said target rack compartment via said lifting/pushing device.

2. The method according to claim 1, wherein during the unloading of loads, steps a, b, c, d, e, f, g, h and i are performed accordingly in the reverse order.

3. The method according to claim 1, wherein each transporting step, during the transport of the load is carried out at an angle of 90° from the previous transporting step.

4. A storage system for loading and unloading loads in a rack storage warehouse comprising:
   a plurality of rack bays, wherein each rack bay has a plurality of rack levels, and each rack level has a plurality of rack compartments;
   a loading track that extends substantially horizontally along front ends of said plurality of rack bays wherein said loading track is positioned at a bottom end of said plurality of rack bays;
   a plurality of rack aisles disposed between said plurality of rack bays and extending out above said loading track;
   a plurality of guiding elements provided on said loading track and in said plurality of rack aisles associated with individual rack levels;
   a plurality of movable transport devices provided on said plurality of guiding elements in said rack aisles suitable for receiving loads;
   a plurality of stationary vertical conveyors disposed at said front ends of said plurality of rack bays, having a floor that can be driven up and down and positioned above said loading track wherein said plurality of guiding elements extend between said plurality of vertical conveyors;
   at least one loading track transport device moveable in a horizontal direction below said floor of said plurality of stationary vertical conveyors, and along said plurality of guiding elements in said loading track wherein said at least one loading track transport device further comprises at least one lifting and pushing system for loading and unloading cartons from said plurality of vertical conveyors;
   wherein each of said plurality of movable transport devices further comprises a lifting/pushing system for displacing the loads sideways into and out of said rack compartments and said stationary vertical conveyor, wherein said lifting and pushing system has a lower zone.

5. The storage system according to claim 4, wherein said stationary vertical conveyors lift the loads to said transport devices on said plurality of guiding elements in said plurality of rack aisles.

6. The storage system according to claim 4, further comprising a plurality of rack elements that span said plurality of rack aisles and are secured on said plurality of rack compartments on each of said plurality of rack levels and comprise transverse struts, wherein said guiding elements are integrated in said plurality of rack elements.

7. The storage system according to claim 4, wherein said stationary vertical conveyors and said transport devices can be driven by means of pulling systems.

8. The storage system according to claim 4, further comprising two transport devices disposed in said rack aisles, wherein said transport devices are connected with each other.

9. The storage system according to claim 4, wherein said plurality of movable transport devices and said at least-one loading track transport device each comprise rollers having a running surface adapted to the shape of at least one of said plurality of guiding elements.

10. The storage system according to claim 4, wherein said lifting/pushing system comprises running wheels in said lower zone, and wherein said lifting system acts in an upward direction so that loads can be raised against a load weight that acts on a floor of said lifting/pushing system.

11. The storage system according to claim 10, wherein said lifting/pushing system further comprises a plurality of lifting bars for raising a lifting component wherein said lifting bars are disposed adjacent to said running wheels.

12. A method of loading and unloading loads in a rack storage warehouse comprising a plurality of rack bays having a plurality of rack levels, and each rack level having a plurality of rack compartments, as well as a plurality of rack aisles located between the rack bays, method of loading and unloading comprising the steps:
   (a) transporting the load via a portable transport device in a first horizontal direction along a loading track that extends along front ends of the plurality of rack bays to a first stationary vertical conveyor selected from a plurality of stationary vertical conveyors at a front end of a target rack bay;

(b) removing said load from said transport device;

(c) depositing the load on said stationary vertical conveyor via a lifting/pushing device on said transport device which is on said loading track;

(d) transporting the load in a first vertical direction via said first stationary vertical conveyor up said front end of said target rack bay to a target rack level;

(e) moving a transport device along a rack aisle to a position adjacent to said stationary vertical conveyor and above said loading track;

(f) removing the load from said stationary vertical conveyor via a lifting/pushing device on said transport device in said rack aisle at said target rack level;

(g) transporting the load in a second horizontal direction in the rack aisle via said transport device movable on guiding elements associated with each individual level of the rack bays, to a target rack compartment in said respective target rack level;

(h) transporting the load in a third horizontal direction from the rack aisle into said target rack compartment via said lifting and pushing device of said transport device, capable of lifting the load over a small distance;

(i) depositing the load in said target rack compartment via said lifting/pushing device; and (j) holding a remaining set of stationary vertical conveyors taken from said plurality of stationary vertical conveyors in a waiting position so that said transport device can drive on said loading track without any obstructions up to a desired stationary vertical conveyor.

13. A storage system for loading and unloading loads in a rack storage warehouse comprising:

a plurality of rack bays, wherein each rack bay has a plurality of rack levels, and each rack level has a plurality of rack compartments;

a loading track that extends substantially horizontally along front ends of said plurality of rack bays wherein said loading track is positioned at a bottom end of said plurality of rack bays;

a plurality of rack aisles disposed between said plurality of rack bays and extending out above said loading track;

a plurality of guiding elements provided on said loading track and in said plurality of rack aisles associated with individual rack levels;

a plurality of movable transport devices provided on said plurality of guiding elements and in said rack aisles suitable for receiving loads;

a plurality of stationary vertical conveyors disposed at said front ends of said plurality of rack bays, having a floor that can be driven up and down wherein each of said plurality of stationary vertical conveyors has at least one side coupled to a corresponding rack bay and at least one side coupled to a corresponding rack aisle and wherein said plurality of stationary vertical conveyors are positioned above said loading track and wherein said plurality of guiding elements extend between said plurality of vertical conveyors; and at least one loading track transport device moveable in a horizontal direction below said floor of said plurality of stationary vertical conveyors, and along said plurality of guiding elements in said loading track wherein said at least one loading track transport device further comprises at least one lifting and pushing system for loading and unloading cartons from said plurality of vertical conveyors;

wherein each of said plurality of movable transport devices further comprises a lifting/pushing system for displacing the loads sideways into and out of said rack compartments and said stationary vertical conveyor, wherein said lifting and pushing system has a lower zone.

* * * * *